United States Patent Office 3,344,042
Patented Sept. 26, 1967

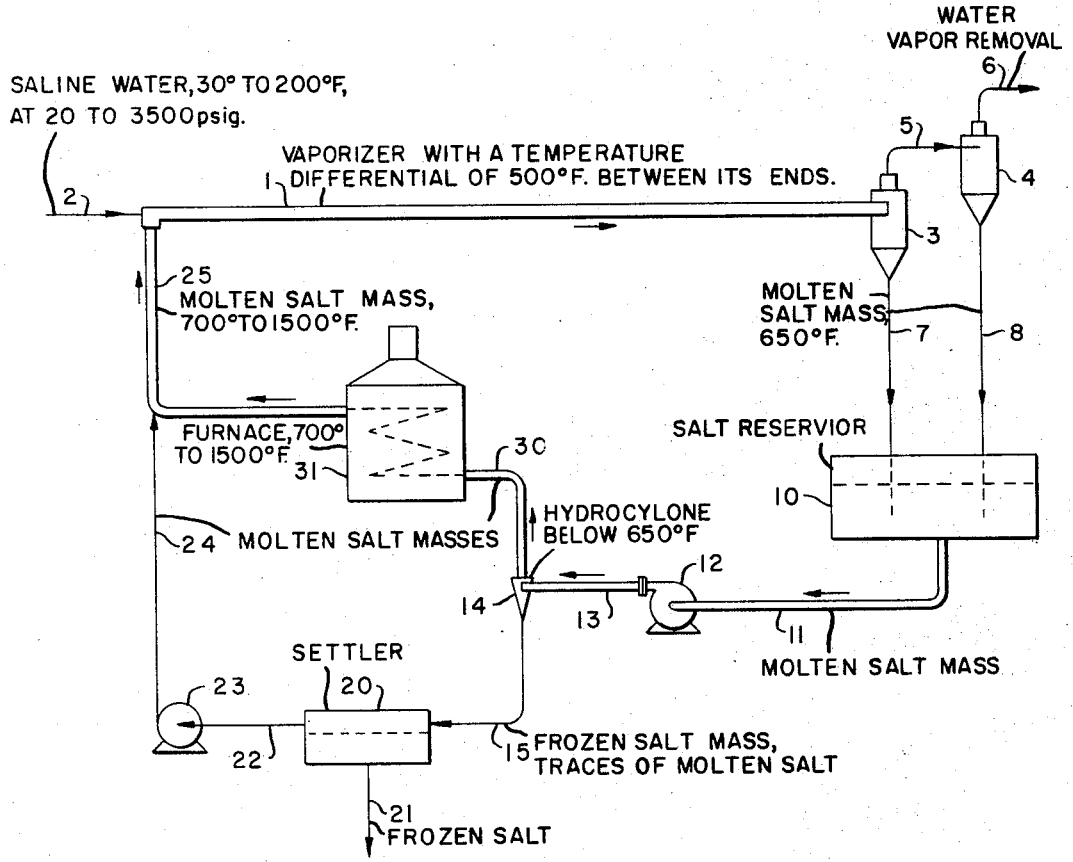

3,344,042
DESALINATION OF SALT WATER USING A MOLTEN SALT MASS AS HEATING MEDIUM
Donald E. Hardesty, Houston, Tex., assignor to Shell Oil Company, New York, N.Y., a corporation of Delaware
Filed Mar. 14, 1966, Ser. No. 534,111
2 Claims. (Cl. 203—11)

ABSTRACT OF THE DISCLOSURE

Saline water is heated in the presence of a molten salt mass derived as residue from the saline water. Water vapor generated as a result of the heat exchange is recovered as product.

---

This invention relates to the desalination of salt water and to the recovery of the salts therefrom. More particularly, it relates to the removal of salts from saline water by a vaporization process in which a molten salt system serves as the medium for supplying heat.

Saline waters may be broadly defined as all waters not considered generally usable, including brackish waters, sea water, and, in general, salt solutions of any kind in which the solvents system is compatible. Sea water may be taken as typical of saline water. It has, generally, about 30,000 to 40,000 parts per million of dissolved salts, the chloride salts predominating. A table setting forth the known abundance of the elements in sea water is found at page 12A of the June 1, 1964, issue of "Chemical and Engineering News." The U.S. Office of Saline Water, in a publication entitled "A Standardized Procedure for Estimating Costs of Saline Water Conversion," dated March 1965, at page 8, lists 500 parts per million as the upper limit of the salt concentration in fresh, potable water.

Several processes for obtaining fresh, potable water from sea water have been developed. Distillation processes are known to work well, and other methods such as fractional crystallization (see, e.g., Colton et al., U.S. Patent 3,095,295, issued January 25, 1963) and reverse osmosis have been fairly successful. Several systems now being tested are described in the January 4, 1965, issue of "Chemical and Engineering News," at pages 39–39.

However, these processes have proved to be very expensive to operate, primarily because of fouling of the heat exchanger surfaces and reactor plugging. The cost of potable water obtained by these processes is inordinately high, and their use on a commercial scale is presently regarded as impractical at best.

It is, therefore, an object of the present invention to provide a process for the recovery of purified water from saline water such as sea water. A further object of the present invention is to provide a process for the recovery of salts from sea water.

Other objects, aspects and advantages of the present invention will be apparent from a study of the disclosure and appended claims, with particular reference to the drawing, wherein the sole figure is a simplified flow sheet illustrating a preferred embodiment of the invention.

In accordance with the present invention, it has been found that the conversion of saline waters can be effected by a vaporization process in which a molten salt system serves as a direct heat exchange means. At the same time, the salts contained in the saline water can be recovered. Salt levels below 225 parts per million in the product water can be obtained from a saline feed stream with sea salt concentrations of greater than about 10,000 parts per million, and at least as high a 40,000 parts per million, by using the process of the present invention.

Briefly described, the invention consists of feeding saline water in liquid phase into a high-temperature flowing molten salt system, whereby the water is directly contacted with the molten salt, and is immediately vaporized, leaving the sea salts in the flowing molten salt stream, the salt system being maintained at a uniform composition by the technique of salt dropout. The product water may be obtained in the form of superheated steam, which may be subsequently condensed; or in the form of high-pressure superheated steam, which may be used directly as a power source for other plant operations. In addition, the salts recovered from the saline water stream are available for subsequent chemical processing.

The molten salt system of the present invention, which serves as a direct contact heat exchange medium, contains a proportion of sea water salts, commonly called sea salts, at some steady state concentration which is reached in a continuous process, depending on the salt dropout temperature. The salt system should be thermally stable at temperatures in excess of 1500° F., and have a high heat capacity per pound of salt.

In a preferred embodiment of the invention, a sodium hydroxide/sea salt mixture is used, which has the eutectic composition for the chosen lowest temperature of operation, generally from 650° to 700° F. However, there are many other workable salt systems, some of which offer advantages over the sodium hydroxide/sea salt system in various regions such as melting points, solubilities, densities, surface tensions, viscosities or corrosion rates. The salts which are usable, however, can be classified generally as the halides, preferably the chlorides, bromides or iodides, or the hydroxides of the alkali metals, preferably lithium, sodium or potassium; or the halides, preferably the chlorides, of the alkaline earth metals, preferably magnesium, calcium or strontium. However, throughout this specification, the sodium hydroxide/sea salt system will be considered to be as a model salt system because of the ready availability and low price of sodium hydroxide; and, for the sake of brevity and clarity, the following detailed description of a preferred embodiment of the invention will be made with respect to this system.

Referring now to the drawing, saline water enters vaporizer 1, via line 2 at a temperature of from about 30° F. to about 200° F., preferably about 160° F., at a pressure of from about 20 to 3500 p.s.i.g. In a preferred embodiment of the invention, the vaporizer is a horizontal pipeline reactor. The molten salt enters vaporizer 1 via salt feed line 25, at a temperature between about 700° F. and 1500° F., preferably about 1200° F., and is immediately contacted with the saline water at a weight ratio of saline water/molten sea salt of about 7.8/1, generating steam. The vaporizer is operated with a large temperature differential between its ends, preferably about 500° F., and additional saline water feed may be introduced at spaced points along the length of the vaporizer. The liquid-vapor stream proceeds along vaporizer 1, and is fed into cyclone 3, where the bulk of the molten salt mixture is dropped into salt reservoir 10 via line 7. If desired, a second cyclone 4, connected to cyclone 3 via line 5, may be added to remove any of the salts that have been entrained in the steam, or that have otherwise escaped from cyclone 3. The product steam is removed from cyclone 4 via line 6, at a temperature of between about 650° F. and 1000° F., and at a pressure of between about 20 and 3500 p.s.i.g. The remaining salts trapped by cyclone 4 are dropped into reservoir 10 via line 8. Those salts whose melting points are above about 650° F., the approximate temperature at the product end of vaporizer 1, freeze out and are passed together with the salts which are still molten at temperatures below about 650° F., into reservoir 10.

The molten salt mixture containing the remaining sea salts leaves reservoir 10 via line 11, and is fed by salt pump 12 via line 13 into hydrocyclone 14. Those salts which are frozen at temperatures below 650° F. are separated from the salts which are still molten at that temperature in hydrocyclone 14. These frozen salts, together with a small amount of the still molten salts, are fed via line 15 to settler 20, where they are removed via line 21 for further processing. Alternatively, a slip stream of molten salt containing dissolved sea salts from line 13 is diluted with water allowing sea salts to precipitate and settle out as suggested in R. N. Shreve's Chemical Process Industries, New York, McGraw-Hill (1945), page 287. The aqueous sodium hydroxide solution is then recycled to the molten system.

The residual molten salts in hydrocyclone 14 are fed via line 22 into melt return pump 23, and subsequently, via line 24, into the main molten salt stream 25, for re-entry into vaporizer 1. The molten salts which are removed from the top of hydrocyclone 14 after separation from the frozen salts, are passed via line 30 through furnace 31. The temperature of the molten mass is there raised to between about 700° F. and 1500° F., in preparation for re-entry via line 25 into the vaporizer, where the molten salts are again contacted with the saline water feed.

It should be noted at this point that the product steam leaving cyclone 4 via line 6 can be condensed, and recovered as potable water; or, it can be used directly as a power source for other plant operations. If the steam is to be condensed immediately after leaving the cyclone, then the reactor can be operated at low pressures. However, if the steam is to be used as a power source, e.g., to drive a steam turbine, the reactor should be operated at higher pressures. All of the salt produced, i.e., about 273,000 pounds per million gallons of steam produced, is available for further chemical processing.

Furnace 31 may be operated with any conventional heat source that would satisfactorily supply the heat required; e.g., a portion of the steam produced may be used, either in an indirect or in a direct heat transfer operation. Also, the present invention could be incorporated in an atomic power plant with heat being transferred from the atomic reactor to the circulating molten salt.

While, in a preferred embodiment, the invention has been described with reference to a horizontal pipeline reactor, other reactors may be used, such as that described in U.S. Patent No. 3,081,256 to Hendal et al., issued March 12, 1963. When a vertical reactor such as disclosed in the Hendal patent is used, gravity feeds may be used for the molten salts in place of the pumps required in the embodiment of the invention described above, offering advantages in salt handling which will be apparent to those skilled in the art. If a reactor similar to that described in the Hendal patent is used, the vaporized water and molten salts can be passed up through a vertical tubular reaction zone, the molten salts falling out and being trapped in a recovery zone, and the steam being taken off through a product outlet. The molten salts can then be fed into a salt reservoir, and the frozen salts removed. From the salt reservoir, the molten salts can be fed by gravity to a furnace bottom, located at a point below the reservoir, and there heated to the desired temperature by any convenient heating source, preferably directly by rising hot steam generated in the vaporization step of this invention in an upright elongated heating zone provided with an expanded top section which will carry the molten salt in a rising vapor stream to an elevated reservoir. From this reservoir, the molten salt can be fed by gravity back into the bottom of the vertical tubular reaction zone for re-contacting with fresh saline water feed.

It is preferred to have a large temperature differential across the vaporizer, preferably about 500° F., e.g., high and low temperatures of 1200° F. and 700° F. In a reactor such as that described in the drawing with a salt composition at the inlet to the vaporizer of about 66% by weight sodium hydroxide and about 34% by weight sea salt (eutectic at 700° F. and having an average heat capacity of about 0.354 B.t.u./pound/°F.), about 177 B.t.u.'s of heat are available at a 500° F. differential for each pound of circulating salt. Thus, 0.47 gallon of circulating salt would produce one pound of steam. For a superficial salt velocity of 10 feet/second at the entrance to the vaporizer, suitable vaporizer sizing is available to process one million gallons of saline water per day.

The following examples are given for illustrative purposes only, and are not to be considered as limiting the invention. All percentages are expressed in percent by weight.

*Example I*

Sodium hydroxide was circulated at 900° F. in a reactor via a centrifugal pump, while maintaining the temperature by electrical heating element. Sea water, containing approximately 38,400 parts per million salts, was introduced into the reactor at a rate of about 1.8 pounds per hour. After 25 minutes of run time, the vaporized and condensed product water had a pH of approximately 9, and a salt concentration of about 225 parts per million.

*Example II*

A procedure similar to that of Example I was used, except with about 25–30 p.s.i.g. back pressure in the reactor. The salt water feed contained approximately 39,800 parts per million salts. Product water analysis after about 30 minutes of run time showed 283 p.p.m. salts, and a pH of about 8.

*Example III*

When a procedure similar to that used in Example I is used, except with a sodium hydroxide/sodium chloride mixture in a ratio of about 95% hydroxide to 5% chloride, after a run time of about 30 minutes at a salt temperature of about 750° F. and with a back pressure in the reactor of about 100 p.s.i.g., the product water contains about 250 p.p.m. salts, and has a neutral pH.

The present invention possesses several major advantages over the processes for saline water conversion taught by the prior art. For example, there is no solid heat exchange surface to become fouled, since the heat exchange is accomplished by direct contact between two liquid phases. The operating equipment is relatively small, since the conversion can be performed under pressure. The sea salts may be recovered as solid by-products, and may be subjected to further separations and treatments, and recovered for other uses. High heat fluxes may be used at the primary heat source, since the molten salt is chosen so as to be thermally stable at the temperature employed, and to have a relatively high heat capacity per pound. High-pressure superheated steam can be produced, which may be used as a power source for other plant operations. Finally, since the vapor pressures of the salts employed as heat exchange media are so small (less than 1 mm.), even at the higher contacting temperature, there is virtually no vapor entrainment of the salts in the product.

I claim as my invention:

1. A process for the desalination of saline water comprising the steps of
    (a) contacting a saline water feed stream containing at least about 10,000 parts per million sea salts with a molten salt mass consisting essentially of the halides or hydroxides of the alkali metals, or the halides of the alkaline earth metals, or mixtures thereof, together with a minor proportion of sea salts as recovered hereinafter, at a temperature in excess or 650° F. and in such relative proportions as to vaporize substantially all of the water from said saline water feed stream, to produce a liquid phase consisting essentially of said molten salt mass containing said sea salts dispersed therein;

(b) recovering precipitated sea salts in excess of that of the eutectic mixture by reducing the temperature of said sea salt-containing molten mass to below the freezing points of said sea salts but above the freezing point of said molten mass, and freezing out and separating said sea salts from said molten mass; and (c) condensing the vaporized water as potable water.

2. A process in accordance with claim 1 wherein the molten salt mass consists essentially of about 66 percent by weight sodium hydroxide and about 34 percent by weight sea salts.

References Cited

UNITED STATES PATENTS

| | | |
|---|---|---|
| 1,997,980 | 4/1935 | Smith. |
| 2,182,428 | 12/1939 | Fladmark. |
| 2,954,013 | 9/1960 | Stengel. |
| 2,976,224 | 3/1961 | Gilliland. |
| 3,032,482 | 5/1962 | Shoemaker _____ 203—100 |

NORMAN YUDKOFF, *Primary Examiner.*

D. EDWARDS, *Assistant Examiner.*